(12) United States Patent
Ou

(10) Patent No.: US 12,489,287 B2
(45) Date of Patent: Dec. 2, 2025

(54) POWER MANAGEMENT DEVICE

(71) Applicant: REALTEK SEMICONDUCTOR CORPORATION, Hsinchu (TW)

(72) Inventor: Wei-Wen Ou, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 341 days.

(21) Appl. No.: 18/122,877

(22) Filed: Mar. 17, 2023

(65) Prior Publication Data
US 2023/0299573 A1    Sep. 21, 2023

(30) Foreign Application Priority Data

Mar. 21, 2022   (TW) .................................. 111110356

(51) Int. Cl.
*H02H 3/08* (2006.01)
*H03K 3/017* (2006.01)

(52) U.S. Cl.
CPC ............... *H02H 3/08* (2013.01); *H03K 3/017* (2013.01)

(58) Field of Classification Search
CPC ....... H02H 3/08; H02H 9/025; H02M 1/0009; H02M 1/32; H02M 3/158; H03K 17/0822; H03K 3/017
See application file for complete search history.

(56) References Cited

U.S. PATENT DOCUMENTS

2015/0124827 A1*  5/2015  Rangaraman ........... H04L 69/22
                                                             370/392

* cited by examiner

*Primary Examiner* — Danny Nguyen
*Assistant Examiner* — Daniel R Schwarck
(74) *Attorney, Agent, or Firm* — WPAT, PC

(57) ABSTRACT

A power management device includes a pulse-width modulation (PWM) circuit, a pulse-frequency modulation (PFM) circuit, a first switch, a second switch, an overcurrent protection circuit, a current detection circuit, and a short-circuit detection circuit. The PWM/PFM circuit is enabled by a short-circuit detection signal and generates a PWM/PFM signal. The first/second switch is electrically coupled between a high-voltage/low-voltage terminal and an output node, and provides a first/second output current for the output node according to the PWM/PFM signal. The overcurrent protection circuit makes the PWM/PFM circuit turn off the first switch and turn on the second switch when the first output current reaches a current threshold. The current detection circuit makes the PWM/PFM circuit turn off the second switch when the second output current reaches zero and then turn on the first switch. The short-circuit detection circuit generates the short-circuit detection signal according to the power management device's output voltage.

10 Claims, 4 Drawing Sheets

POWER MANAGEMENT DEVICE

BACKGROUND OF THE INVENTION

1. Field of the Invention

The present disclosure relates to a power management device, especially to a power management device capable of short-circuit protection.

2. Description of Related Art

FIG. 1a shows a conventional power management device. The power management device 100 of FIG. 1a includes a pulse width modulation (PWM) circuit 110, a first switch circuit 120, a second switch circuit 130, an overcurrent protection circuit 140, an inductor 150, and a voltage output terminal 160. The PWM circuit 110 is configured to generate a PWM signal for turning on/off the first switch circuit 120 and turning on/off the second switch circuit 130 and thereby determine an output voltage $V_{OUT}$ at the voltage output terminal 160. The overcurrent protection circuit 140 is configured to detect whether an output current $I_L$ passing through the first switch circuit 120 reaches a current threshold (e.g., the current threshold as shown in FIG. 1b). During a present cycle of operation of the PWM signal, if the voltage terminal 160 is short-circuited to a ground terminal or a certain voltage terminal, the output voltage $V_{OUT}$ will decrease to a ground voltage (e.g., 0V) or to the voltage of the certain voltage terminal, and the output current $I_L$ will increase to the current threshold rapidly; meanwhile, the overcurrent protection circuit 140 will make the PWM circuit 110 turn off the first switch circuit 120 and turn on the second switch circuit 130 during the remaining time of the present cycle of operation till the start of a next cycle of operation of the PWM signal and thereby stabilize the output current $I_L$.

Regarding FIG. 1a, the overcurrent protection circuit 140 needs a reaction time to ascertain that the output current $I_L$ reaches the current threshold and to make the PWM circuit 110 turn off the first switch circuit 120 and turn on the second switch circuit 130. During the reaction time, the first switch circuit 120 is still turned on and the output current rises rapidly. After the reaction time, the first switch circuit 120 is turned off and the second switch circuit 130 is turned on during the remaining time of the present cycle of operation while one end of the inductor 150 is electrically coupled to the ground terminal via the second switch circuit 130 and the other end of the inductor 150 is short-circuited to the ground terminal via the voltage terminal 160, and accordingly the inductor 150 cannot dissipate energy at a normal discharge speed. As a result, the output current $I_L$ decreases slightly in the remaining time of the present cycle of operation and continues to rise during the next cycle of operation.

In light of the above, when the voltage output terminal 160 is short-circuited to a ground terminal, the output current $I_L$ is likely to accumulate and keep rising as shown in FIG. 1b, and this may damage a system using the power management device 100.

SUMMARY OF THE INVENTION

An object of the present disclosure is to provide a power management device as an improvement over the prior art.

An embodiment of the power management device of the present disclosure includes a pulse width modulation (PWM) circuit, a pulse frequency modulation (PFM) circuit, a first switch circuit, a second switch circuit, an overcurrent protection circuit, a current detection circuit, and a short-circuit detection circuit.

In regard to the above-mentioned embodiment, the PWM circuit is configured to be enabled or disabled according to a short-circuit detection signal, and configured to operate in a PWM mode when being enabled and thereby generate a PWM signal. The PFM circuit is configured to be enabled or disabled according to the short-circuit detection signal, and configured to operate in a PFM mode when being enabled and thereby generate a PFM signal. The first switch circuit is electrically coupled between a high-voltage terminal and an output node, configured to output a first output current to the output node according to the PWM signal in the PWM mode, and configured to output the first output current to the output node according to the PFM signal in the PFM mode, wherein the first output current is for generating an output voltage of the power management device. The second switch circuit is electrically coupled between the output node and a low-voltage terminal, configured to transmit a second output current passing through the output node according to the PWM signal in the PWM mode, and configured to transmit the second output current passing through the output node according to the PFM signal in the PFM mode, wherein the second output current is for generating the output voltage. The overcurrent protection circuit is electrically coupled between the high-voltage terminal and the output node, configured to detect whether the first output current reaches a first current threshold in an operating mode, and configured to send out an overcurrent protection signal when the first output current reaches the first current threshold and thereby request an operating circuit to turn off the first switch circuit and turn on the second switch circuit, wherein the operating mode is any of the PWM mode and the PFM mode, when the operating mode is the PWM mode, the operating circuit is the PWM circuit, and when the operating mode is the PFM mode, the operating circuit is the PFM circuit. The current detection circuit is electrically coupled between the output node and the low-voltage terminal, configured to detect whether the second output current reaches a predetermined current threshold in the operating mode, and configured to send out a current detection signal when the second output current reaches the predetermined current threshold and thereby request the operating circuit to turn off the second switch circuit; after the second switch circuit is turned off, the operating circuit turns on the first switch circuit according to an output request that is detected by a system including the power management device. The short-circuit detection circuit is configured to detect whether the output voltage reaches a voltage threshold, and configured to send out the short-circuit detection signal to disable the PWM circuit and enable the PFM circuit when the output voltage reaches the voltage threshold.

These and other objectives of the present invention will no doubt become obvious to those of ordinary skill in the art after reading the following detailed description of the preferred embodiments that are illustrated in the various figures and drawings.

BRIEF DESCRIPTION OF THE DRAWINGS

FIG. 1b shows a relation between the output voltage and the output current of FIG. 1a.

DETAILED DESCRIPTION OF THE PREFERRED EMBODIMENTS

The present specification discloses a power management device capable of short-circuit protection. The device can prevent the accumulation of an output current even though a voltage output terminal of the device is short-circuited to a ground terminal. The device is applicable to/included in a Bluetooth device or an electronic device, wherein the electronic device here is a battery powered electronic device.

Figure 1A:
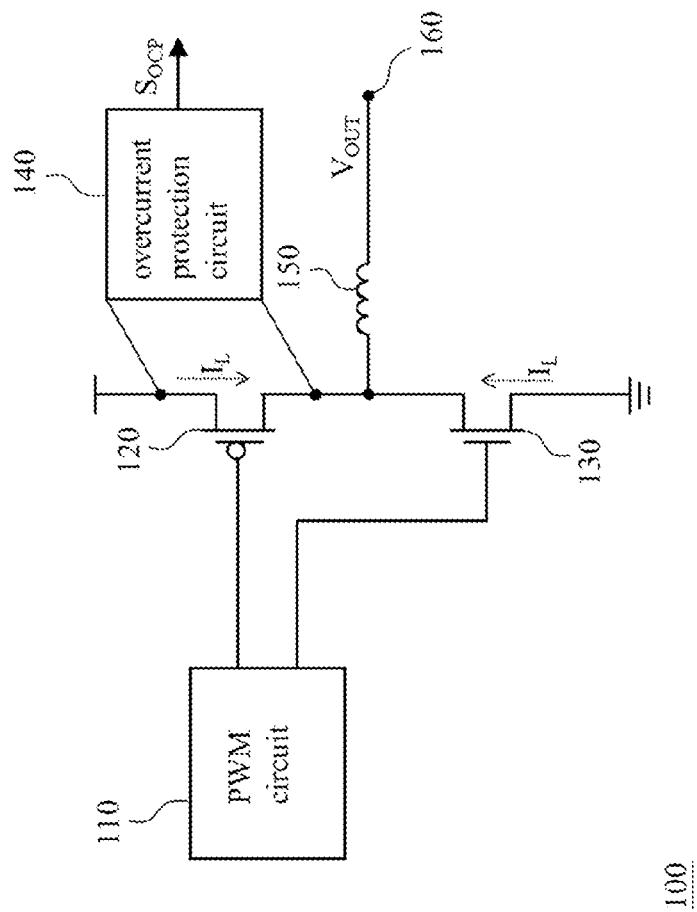
FIG. 1a shows a conventional power management device.
Figure 1B:
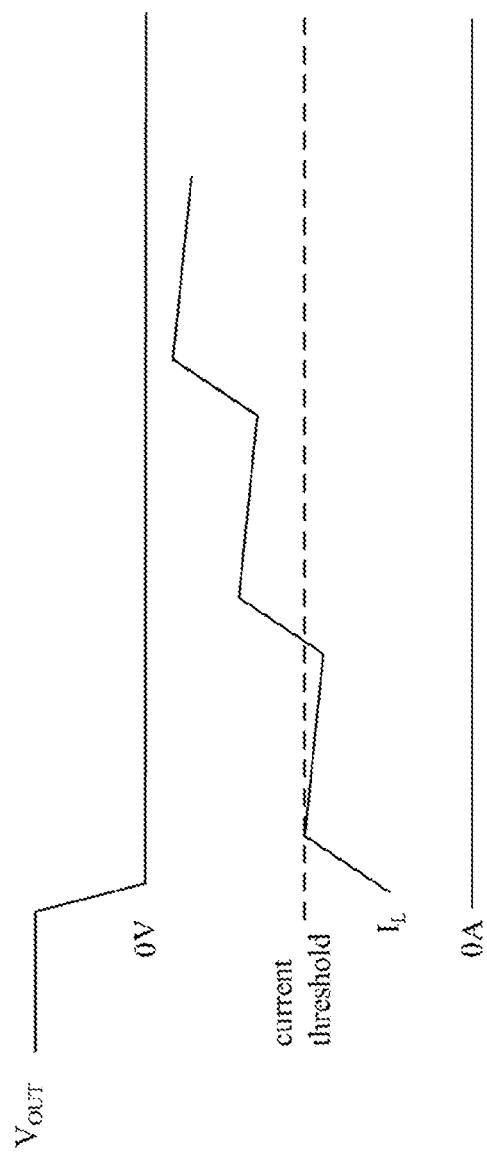
Figure 2:
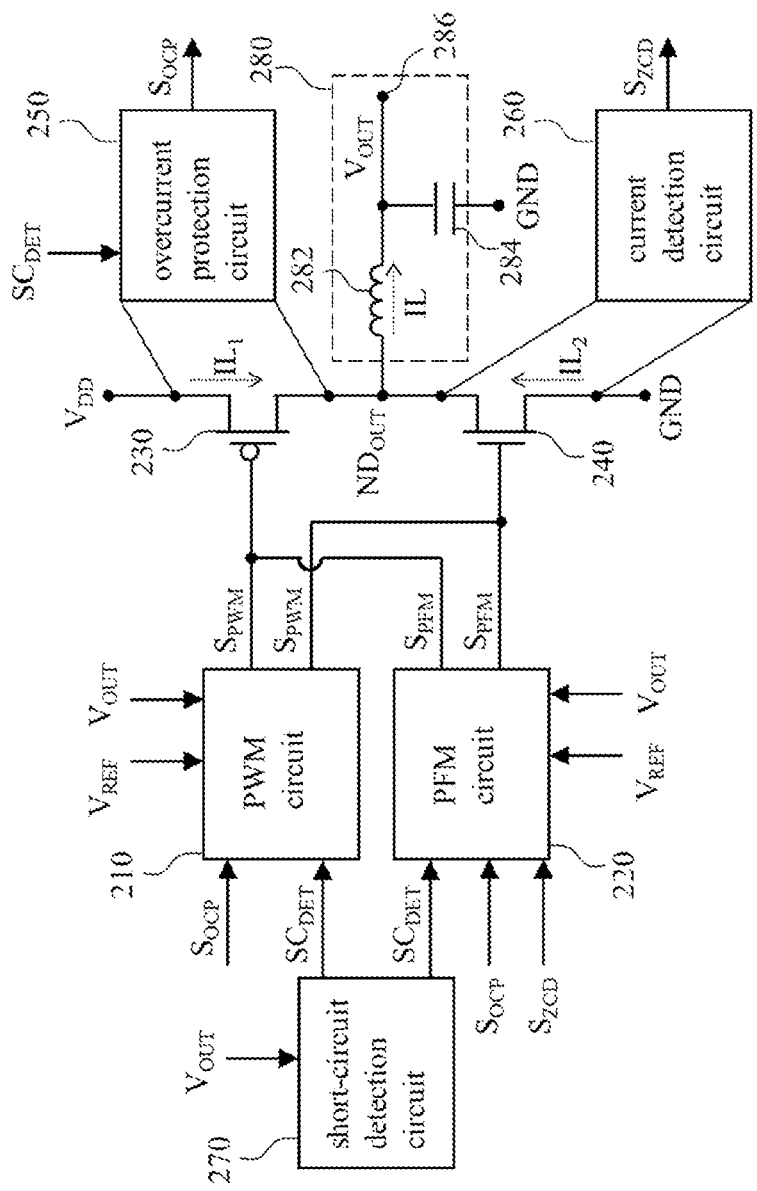
FIG. 2 shows an embodiment of the power management device of the present disclosure.

FIG. 2 shows an embodiment of the power management device of the present disclosure. The power management device 200 of FIG. 2 includes a pulse width modulation (PWM) circuit 210, a pulse frequency modulation (PFM) circuit 220, a first switch circuit 230, a second switch circuit 240, an overcurrent protection circuit 250, a current detection circuit 260, a short-circuit detection circuit 270, and an output circuit 280. These circuits are described in the following paragraphs, respectively.

In regard to the embodiment of FIG. 2, the PWM circuit 210 is configured to be enabled or disabled according to a short-circuit detection signal $SC_{DET}$, and configured to operate in a PWM mode when being enabled and thereby generate a PWM signal $S_{PWM}$. In the PWM mode, the PWM circuit 210 generates the PWM signal $S_{PWM}$ according to a reference voltage $V_{REF}$ and an output voltage $V_{OUT}$, wherein the reference voltage $V_{REF}$ is determined according to the requirements for implementation and the output voltage $V_{OUT}$ is generated for a load (not shown in FIG. 2). For example, the PWM circuit 210 compares the reference voltage $V_{REF}$ with the output voltage $V_{OUT}$ and thereby determines how to modulate the pulse width of the PWM signal $S_{PWM}$, and accordingly the PWM circuit 210 controls the output voltage $V_{OUT}$ for the load. Since the PWM circuit 210 can be implemented with known/self-developed technologies based on the present disclosure, its detail is omitted here.

In regard to the embodiment of FIG. 2, the PFM circuit 220 is configured to be enabled or disabled according to the short-circuit detection signal $SC_{DET}$, and configured to operate in a PFM mode when being enabled and thereby generate a PFM signal $S_{PFM}$. In the PFM mode, the PFM circuit 220 generates the PFM signal $S_{PFM}$ according to the reference voltage $V_{REF}$ and the output voltage $V_{OUT}$. For example, the PFM circuit 220 compares the reference voltage $V_{REF}$ with the output voltage $V_{OUT}$ and thereby determines how to modulate the pulse frequency of the PFM signal $S_{PFM}$, and accordingly the PFM circuit 220 controls the output voltage $V_{OUT}$ for the load. Since the PFM circuit 220 can be implemented with known/self-developed technologies based on the present disclosure, its detail is omitted here.

In regard to the embodiment of FIG. 2, the first switch circuit 230 is electrically coupled between a high-voltage terminal $V_{DD}$ and an output node $ND_{OUT}$, configured to output a first output current $IL_1$ to the output node $ND_{OUT}$ according to the PWM signal $S_{PWM}$ in the PWM mode, and configured to output the first output current $IL_1$ to the output node $ND_{OUT}$ according to the PFM signal $S_{PFM}$ in the PFM mode. In this embodiment, the first switch circuit 230 is a P-channel metal oxide semiconductor (PMOS) transistor, but the present invention is not limited thereto.

In regard to the embodiment of FIG. 2, the second switch circuit 240 is electrically coupled between the output node $ND_{OUT}$ and a low-voltage terminal GND (e.g., a ground terminal), configured to transmit a second output current $IL_2$ passing through the output node $ND_{OUT}$ according to the PWM signal $S_{PWM}$ in the PWM mode, and configured to transmit the second output current $IL_2$ passing through the output node $ND_{OUT}$ according to the PFM signal $S_{PFM}$ in the PFM mode. In this embodiment, the second switch circuit 240 is an N-channel metal oxide semiconductor (NMOS) transistor, but the present invention is not limited thereto; to be more specific, the first switch circuit 230 and the second switch circuit 240 can be implemented with all kinds of known/self-developed switches as long as the two switches are not turned on concurrently.

In regard to the embodiment of FIG. 2, the overcurrent protection circuit 250 is electrically coupled between the high-voltage terminal $V_{DD}$ and the output node $ND_{OUT}$, configured to detect whether the first output current $IL_1$ reaches a first current threshold in an operating mode, and configured to send out an overcurrent protection signal $S_{OCP}$ when the first output current $IL_1$ reaches the first current threshold and thereby request an operating circuit to turn off the first switch circuit 230 and turn on the second switch circuit 240, wherein the operating mode is any of the aforementioned PWM mode and the PFM mode, when the operating mode is the PWM mode, the operating circuit is the PWM circuit 210, and when the operating mode is the PFM mode, the operating circuit is the PFM circuit 220.

In regard to the embodiment of FIG. 2, the current detection circuit 260 is electrically coupled between the output node $ND_{OUT}$ and the low-voltage terminal GND, configured to detect whether the second output current $IL_2$ reaches a predetermined current threshold (e.g., 0A) in the operating mode, and configured to send out a current detection signal $S_{ZCD}$ when the second output current $IL_2$ reaches the predetermined current threshold and thereby request the operating circuit to turn off the second switch circuit 240 and turn on the first switch circuit 230. Since the current detection circuit 260 can be implemented with known/self-developed technologies (e.g., known zero-current detection technologies), its detail is omitted here.

In regard to the embodiment of FIG. 2, the short-circuit detection circuit 270 is configured to detect whether the output voltage $V_{OUT}$ reaches a warning voltage threshold (e.g., the voltage of the low-voltage terminal GND, or any voltage determined according to the requirements for implementation), and configured to send out the aforementioned short-circuit detection signal $SC_{DET}$ to disable the PWM circuit 210 and enable the PFM circuit 220 when the output voltage $V_{OUT}$ reaches the warning voltage threshold; accordingly, the power management device 200 enters the PFM mode from the PWM mode when the output voltage $V_{OUT}$ reaches the warning voltage threshold. In the PFM mode, the short-circuit detection circuit 270 is configured to detect whether the output voltage $V_{OUT}$ returns to a safe voltage threshold for short-circuit protection; if so, the short-circuited problem is found over, and the short-circuit detection circuit 270 enables the PWM circuit 210 and disables the PFM circuit 220 to make the power management device 200 return to the PWM mode from the PFM mode.

In regard to the embodiment of FIG. 2, an exemplary implementation of the output circuit 280 includes an inductor 282, a capacitor 284, and a voltage output terminal 286. The inductor 284 is electrically coupled between the output node $ND_{OUT}$ and the voltage output terminal 286. The capacitor 284 has one end electrically coupled between the inductor 282 and the voltage output terminal 286, and has another end electrically coupled with the low-voltage terminal GND. In the PWM mode, the output current IL passing through the inductor 282 is equal to the sum of the first output current $IL_1$ and the second output current $IL_2$; similarly, in the PFM mode, the output current IL passing through the inductor 282 is equal to the sum of the first output current $IL_1$ and the second output current $IL_2$. The inductor 282 and the capacitor 284 are used for stabilizing the output voltage $V_{OUT}$.

Figure 3:
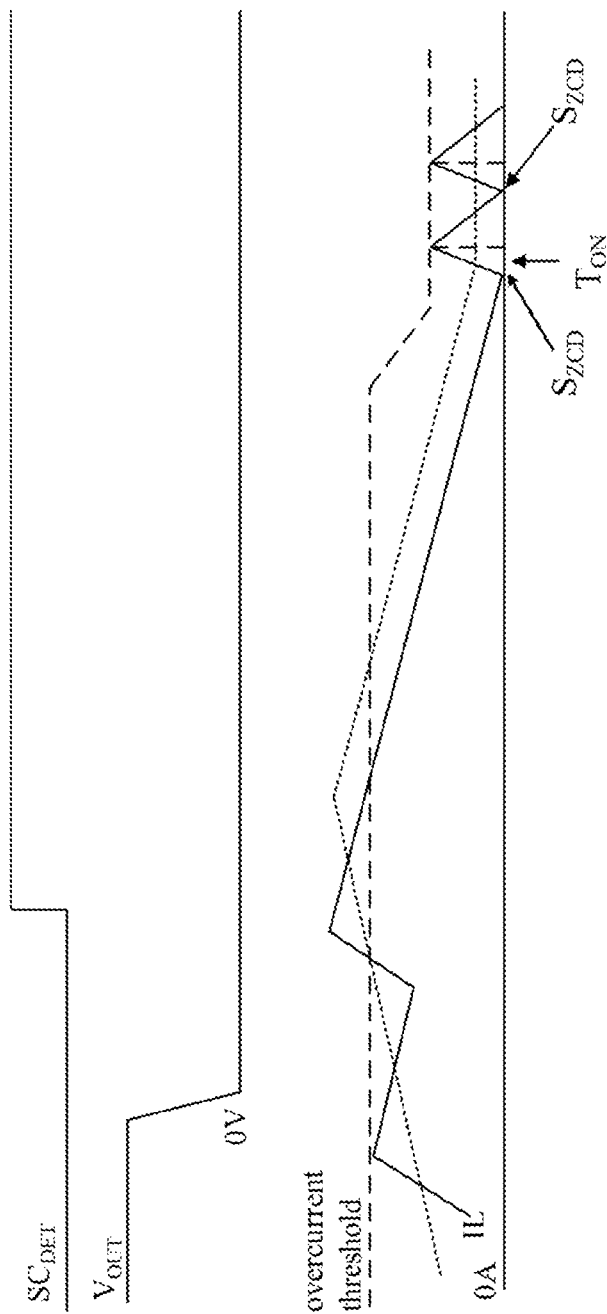
FIG. 3 shows an exemplary signal relation based on the embodiment of FIG. 2.

FIG. 3 shows an exemplary signal relation based on the embodiment of FIG. 2. Regarding FIGS. 2~3, after the output voltage $V_{OUT}$ decreases to 0V (e.g., after the voltage output terminal 286 is short-circuited to a ground terminal), the output current IL rapidly increases and reaches the overcurrent threshold (i.e., the aforementioned first current threshold), and consequently the PWM circuit 210 turns off the first switch circuit 230 and turns on the second switch circuit 240; in the meantime, since the voltage difference between the inductor 282 is zero, the inductor 282 cannot fulfill the characteristic of a discharge slope and thus the output current IL will climb up to a higher level gradually; afterward, the short-circuit detection circuit 270 finds that the output voltage $V_{OUT}$ reaches the aforementioned voltage threshold, and thus changes the short-circuit detection signal $SC_{DET}$ from a low level to a high level to make the power management device 200 enters the PFM mode from the PWM mode. In the PFM mode, the PFM circuit 220 compares the output voltage $V_{OUT}$ with the reference voltage $V_{REF}$ to turn on the first switch circuit 230 for a fixed interval, and then turns off the first switch circuit 230 right after the fixed interval; next, the PFM circuit 220 turns on the second switch circuit 240 till the current detection circuit 260 finds that the output current IL reaches the predetermined current threshold (i.e., 0A in FIG. 3); afterward, the PFM circuit 220 turns on the first switch circuit 230 for another fixed interval according to an output request, and then turns off the first switch circuit 230, wherein the output request is detected by a system using the power management device 200.

On the basis of the above, if the current detection circuit 260 determines that the output current IL does not reach the predetermined current threshold, the PFM circuit 220 keeps turning on the second switch circuit 240 and turning off the first switch circuit 230 till the output current IL decreases to the predetermined current threshold. When the output current IL decreases to the predetermined current threshold, the current detection circuit 260 sends out the current detection signal $S_{ZCD}$ (e.g., a high level signal) to request the PFM circuit 220 to turn on the first switch circuit 230 and turn off the second switch circuit 240; afterward, the PFM circuit 220 turns on the first switch circuit 230 for a fixed interval $T_{ON}$ in a present cycle of operation, and then turns off the first switch circuit 230 and turns on the second switch circuit 240 till the level of the current detection signal $S_{ZCD}$ changes from a low level to a high level; and in a next cycle of operation, the PFM circuit 220 repeats the above-mentioned process. It is noted that the dotted line in FIG. 3 indicates the average of the output current IL, that is to say a current for an output load.

Regarding FIGS. 2~3, the overcurrent protection circuit 250 can optionally lower the overcurrent threshold and then detect whether the first output current $IL_1$ reaches the lowered overcurrent threshold in the PFM mode, wherein the lowered overcurrent threshold could be fifty percent of the original overcurrent threshold or be determined according to the requirements for implementation. When the first output current $IL_1$ reaches the lowered overcurrent threshold, the overcurrent protection circuit 250 sends out the overcurrent protection signal $S_{OCP}$ to request the PFM circuit 210 to turn off the first switch circuit 210 and turn on the second switch circuit 220 even though the aforementioned fixed interval $T_{ON}$ has not finished yet.

It is noted that people having ordinary skill in the art can selectively use some or all of the features of any embodiment in this specification or selectively use some or all of the features of multiple embodiments in this specification to implement the present invention as long as such implementation is practicable; in other words, the way to implement the present invention can be flexible based on the present disclosure.

To sum up, the power management device of the present disclosure can prevent the accumulation of an output current even though a voltage output terminal of the device is short-circuited to a ground terminal.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. A device, comprising:
   a pulse width modulation (PWM) circuit configured to be enabled or disabled according to a short-circuit detection signal, and configured to operate in a PWM mode when being enabled and thereby generate a PWM signal;
   a pulse frequency modulation (PFM) circuit configured to be enabled or disabled according to the short-circuit detection signal, and configured to operate in a PFM mode when being enabled and thereby generate a PFM signal;
   a first switch circuit electrically coupled between a high-voltage terminal and an output node, configured to output a first output current to the output node according to the PWM signal in the PWM mode, and configured to output the first output current to the output node according to the PFM signal in the PFM mode, wherein the first output current is for generating an output voltage of the device;
   a second switch circuit electrically coupled between the output node and a low-voltage terminal, configured to transmit a second output current passing through the output node according to the PWM signal in the PWM mode, and configured to transmit the second output current passing through the output node according to the PFM signal in the PFM mode, wherein the second output current is for generating the output voltage;
   an overcurrent protection circuit electrically coupled between the high-voltage terminal and the output node, configured to detect whether the first output current reaches a first current threshold in an operating mode, and configured to send out an overcurrent protection signal when the first output current reaches the first current threshold and thereby request an operating circuit to turn off the first switch circuit and turn on the second switch circuit, wherein the operating mode is any of the PWM mode and the PFM mode, when the operating mode is the PWM mode, the operating circuit is the PWM circuit, and when the operating mode is the PFM mode, the operating circuit is the PFM circuit;
   a zero-current detection circuit electrically coupled between the output node and the low-voltage terminal, configured to detect whether the second output current reaches a predetermined current threshold in the operating mode, and configured to send out a current detection signal when the second output current reaches the predetermined current threshold and thereby request the operating circuit to turn off the second switch circuit; and a short-circuit detection circuit configured to detect whether the output voltage reaches a voltage threshold, and configured to send out the short-circuit detection signal to disable the PWM circuit and enable the PFM circuit when the output voltage reaches the voltage threshold.

2. The device of claim 1, wherein in the PFM mode, the PFM circuit turns on the first switch circuit for a fixed interval of a present cycle of operation, then the PFM circuit turns off the first switch circuit and turns on the second switch circuit till a start of a next cycle of operation, the current detection signal determines the start of the next cycle of operation, and the PFM circuit turns on the first switch circuit during the next cycle of operation according to an output request.

3. The device of claim 1, wherein the overcurrent protection circuit is further configured to lower the first current threshold under a preset condition and then detect whether the first output current reaches the first current threshold.

4. The device of claim 1, wherein the predetermined current threshold is zero ampere.

5. The device of claim 1, wherein in the PWM mode, the PWM circuit generates the PWM signal according to a reference voltage and the output voltage.

6. The device of claim 1, wherein in the PFM mode, the PFM circuit generates the PFM signal according to a reference voltage and the output voltage.

7. The device of claim 1, wherein the voltage threshold is a voltage at the low-voltage terminal, or a voltage determined arbitrarily.

8. The device of claim 1, further comprising an output circuit, wherein the output circuit includes:

an inductor electrically coupled between the output node and a voltage output terminal having a voltage being the output voltage; and a capacitor having one end electrically coupled between the inductor and the voltage output terminal, and having another end electrically coupled with the low-voltage terminal.

9. The device of claim 1, wherein the device is included in a Bluetooth device.

10. The device of claim 1, wherein the device is included in a battery-powered electronic device.

* * * * *